(12) United States Patent
Reichelsheimer et al.

(10) Patent No.: US 7,959,186 B2
(45) Date of Patent: Jun. 14, 2011

(54) SIGNALING LABELS AND FLUORESCENT INK COMPOSITIONS

(75) Inventors: Jay Reichelsheimer, Shelton, CT (US);
Donald G. Mackay, Roxbury, CT (US);
Richard A. Bernard, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 921 days.

(21) Appl. No.: 11/479,739

(22) Filed: Jun. 30, 2006

(65) Prior Publication Data

US 2008/0001392 A1 Jan. 3, 2008

(51) Int. Cl.
*G09F 3/00* (2006.01)
*B42D 15/00* (2006.01)
*B42D 15/10* (2006.01)

(52) U.S. Cl. ............... 283/71; 283/67; 283/70; 283/72; 283/86; 283/94

(58) Field of Classification Search ............... 106/14.34, 106/14.35, 14.41, 31.02, 31.15, 31.25, 31.28, 106/31.39, 31.32, 31.49, 31.57, 31.58, 31.64; 156/DIG. 21, DIG. 32, DIG. 35, DIG. 36; 252/301.16, 310.35, 301.36; 283/96, 97, 283/101, 67, 70, 71, 72, 74, 86, 91, 93, 94, 283/109; 427/150, 151, 152; 428/346, 352, 428/354, 914; 435/18, 23, 25, 28; 524/801; 525/54.1; 530/300; 544/249, 289; 546/33, 546/109, 153; 585/2; *C07D 235/00, 235/18, C07D 239/00, 239/91, 263/00, 263/57, 277/00, C07D 277/66; C07F 09/00, 09/6512, 09/6541; C07H 15/00, 15/26; C09D 07/12, 11/00, 11/02; C09K 11/06; C12Q 01/34, 01/42; C09F 03/02*

See application file for complete search history.

(56) References Cited

U.S. PATENT DOCUMENTS

| | | | |
|---|---|---|---|
| 3,011,978 A * | 12/1961 | Gosnell et al. | 252/301.35 |
| 4,738,472 A * | 4/1988 | Shibata | 283/101 |
| 5,290,348 A | 3/1994 | Auslander | 106/23 R |
| 5,443,986 A * | 8/1995 | Haughland et al. | 435/4 |
| 5,693,693 A | 12/1997 | Auslander et al. | 524/88 |
| 6,284,027 B1 | 9/2001 | Auslander et al. | 106/31.15 |
| 6,454,842 B1 * | 9/2002 | Vernardakis et al. | 106/31.02 |
| 6,494,490 B1 * | 12/2002 | Trantoul | 283/91 |
| 7,536,553 B2 * | 5/2009 | Auslander et al. | 283/72 |
| 7,713,616 B2 * | 5/2010 | Kuntz et al. | 283/72 |
| 2004/0231554 A1 * | 11/2004 | Udagawa et al. | 106/31.15 |
| 2008/0284157 A1 * | 11/2008 | Muke et al. | 283/86 |

FOREIGN PATENT DOCUMENTS

KR 933498 B1 * 12/2009

* cited by examiner

*Primary Examiner* — Dana Ross
*Assistant Examiner* — Justin V Lewis
(74) *Attorney, Agent, or Firm* — George M. Macdonald; Steven J. Shapiro; Charles R. Malandra, Jr.

(57) ABSTRACT

A signaling label for use in postage payment evidencing is described including a luminescent signaling section having a primarily green fluorescent ink coating. In one configuration, a primarily green fluorescent ink includes approximately 12 weight percent of a pigment selected from the quinazolinone class of pigments mixed with an acrylic varnish base to provide a primarily green fluorescent signal having with sufficient red fluorescent response to a short UV excitation to trigger a USPS facing system is described.

20 Claims, 4 Drawing Sheets

QUINAZOLINONE    TOSYLATE SALT

SIGNALING LABELS AND FLUORESCENT INK COMPOSITIONS

CROSS-REFERENCE TO RELATED APPLICATION

This application is related to commonly owned, co-pending patent application Ser. No. 10/873,887, entitled "Signaling Blank Label," filed Jun. 22, 2004, which is incorporated herein by reference.

FIELD OF THE INVENTION

The present invention relates to signaling labels and fluorescent inks, and more particularly, to signaling postage labels having a luminescent signaling section and ink compositions used to create the luminescent sections, and more particularly to a signaling postage label and an invisible, fluorescent ink that primarily fluoresces somewhere in the green and yellow regions of the visible spectrum used to coat a portion of the surface area of the signaling postage label.

BACKGROUND OF THE INVENTION

Processing mail with automated equipment at mail processing centers requires correctly orienting the mail so that address information and other related information can be scanned and read. This process is known as facing and is accomplished with facing equipment that is typically part of the Advanced Facer Canceller System (AFCS) equipment in the United States Postal service (USPS) sorting systems. Additionally, a discriminating canceller detects the type of postage evidencing used and cancels stamps by marking over the stamp with a cancellation mark so that the stamps cannot be reused. Other forms of postage payment evidencing such as postage meter indicia and permit mail marks are not typically canceled.

The AFCS system includes a short UV excitation source (254 nm) that is used to excite certain luminescent inks. Certain fluorescent luminescent inks radiate light in a particular wavelength such as the visible spectrum during excitation by a particular source such as a UV source. Certain phosphorescent luminescent inks radiate light in a particular wavelength such as the visible spectrum during and after excitation by a particular source such as a UV source. Both type of luminescent inks described can be used for signaling since the radiated light can be detected by a photo-detector tuned to detect radiation in the particular radiated frequency range. As described herein, the AFCS utilizes several different signaling methods to detect postage payment evidencing marks for facing purposes, but the canceller searches for a green phosphorescent signal to initiate the canceling system.

Currently, postage stamps emit a green phosphorescent signal in response to the AFCS excitation source that is detected by the facer portion of the system and used for mail piece orientation (facing). Additionally, the green phosphorescent signal from the stamp is also used by the canceller portion of the equipment to trigger stamp cancellation. The stamp is typically cancelled by canceling equipment so that it cannot be used again and may also provide information such as the date of processing or induction in the postal system. Such cancellation is typically accomplished by printing a black mark across the stamp that may include induction date information and induction post office location information.

Other postage payment evidencing system such as postage meter indicia and permit mail typically utilize different facing signaling mechanisms that are not detected by the canceller since it is not desirable to cancel postage meter indicia. Traditional postage meter indicia marks utilize visible red fluorescent ink that emits a red fluorescent signal when excited by the UV source. Such red fluorescent signal is utilized by the facing system to detect the indicia, but does not trigger the canceller that is searching for green phosphorescent signals. Traditional permit mail postage payment marks include a Facing Identifier Mark (FIM) barcode used for facing purposes. The facing system detects the barcode using a barcode reader and the barcode does not trigger the canceller. However, these methods can significantly affect the final appearance of the image. Using a FIM requires printing a large barcode in a particular portion of the envelope and thus imposes significant restrictions on what can be printed. Many postage meters utilize ink jet printing to print fluorescent indicia.

More recently, other forms of postage payment evidencing have been utilized including custom stamps and custom image stamps. Such postage payment evidencing products include products that may be printed locally by a consumer using controlled media stock or other stock and also include products that may be custom configured and then centrally printed and shipped to a consumer. In the case of custom image postage evidencing products that include custom images such as baby pictures, it is not considered desirable to cancel such products. Certain custom postage evidencing systems utilize thermal media such as direct contact thermal printing media labels to print postage indicia.

As described, the AFCS facer/canceller equipment uses a short UV excitation source in order to detect a luminescent response from the mail piece. The equipment has at least three detection channels, two of which are used and one of which is unused. There is a green phosphorescent range channel that is used by both the facer/canceller to both face and cancel postage stamps, a red fluorescent range channel that is used to face traditional postage meter indicia. Additionally, there are certain postage indicia label stamps that utilize a visible red fluorescent facing mark that also utilizes the red fluorescent detection channel. There is a red phosphorescence detection channel that is sometimes considered unused in postal specifications, but that current commercially available custom stamp products utilize for detection in the facer equipment. Unfortunately, such custom stamp products utilizing the red phosphorescent channel can result in cancellation of the custom image thereby defeating the purpose of having custom stamp images available for viewing by the recipient.

When the USPS AFCS facer/canceller equipment operates in the USPS sorting equipment stream, the equipment emits a short UV radiation of approximately 254 nm wavelength that is used to excite the face of the mail piece. As described, in the case of phosphorescent stamps, the USPS facer/canceller equipment is calibrated to detect responses to that short UV excitation in a particular range. Additionally, the canceling systems used by the USPS in postal processing detect the phosphorescence signals in order to cancel them. Similarly, the AFCS equipment is calibrated to also detect a red fluorescent response in a particular range. There are known visible red fluorescent inks that do not appreciably emit phosphorescent responses that are detectable by the canceller. However, it may be desirable to have an invisible fluorescent ink that triggers the red fluorescent detection channel, but that does not trigger the phosphorescent channel detected by the canceller. The green detection channels detect certain intensities in approximately the 495 nm-560 nm range and the red channels detect certain intensities in approximately the 560 nm-650 nm range. The USPS LM-2C Phosphor Meter Unit (PMU) test system is typically utilized to test expected response in the AFCS system.

Invisible ink jet inks are described in U.S. patent application Ser. No. 10/331,829 filed Dec. 30, 2002 which is hereby incorporated by reference in its entirety. Color fluorescent inks are described in U.S. patent application publication Nos. US 2002/0195586 A1, US 2003/0005303 A1, and US 2003/0041774 A1, which are hereby incorporated by reference in their entireties. Color luminescent ink, such as a fluorescent ink or a phosphorescent ink is described in U.S. patent application Ser. No. 10/692,569 filed Oct. 24, 2003, which is hereby incorporated by reference in its entirety.

There is a need for a thermal media label stock that provides a fluorescent signature used in postal facing systems. Similarly, there is a need for a thermal media label stock having an invisible ink coating or partial coating that provides a sufficient red fluorescent signature to trigger the AFCS facing system but that does not emit a phosphorescent signal that triggers the USPS AFCS canceller systems. Additionally, there is a need for a thermal media label having such an invisible red fluorescent ink coating that will reliably function in a direct contact thermal media printer and not "block" or jam when being fed through a printing thermal media print head.

Furthermore, there is a need for a thermal media label having such an invisible fluorescent ink coating such that the coating will not be removed in the printing process thus fouling the printer. Additionally, there is a need for such an invisible red fluorescent ink formulation using a varnish providing an ink that may adequately be applied in an appropriate coating process such as a flexographic printing process. Furthermore, there is a need for such an invisible red fluorescent ink formulation using a varnish that suitably adheres to the thermal media and remains on the thermal media throughout the direct contact thermal printing process yet does not unacceptably quench the fluorescent signal of the pigment in the ink.

SUMMARY

The illustrative embodiments of the present application describe physical thermal media configurations including a signaling ink coating along with several alternative fluorescent coating ink formulations including invisible green fluorescent ink formulations.

In one illustrative configuration, a roll of thermal media stock includes perforated labels having an adhesive and backing that may be utilized one at a time in a one-width configuration to include a postage payment indicia or in a two at a time two-wide configuration including a custom image label adjacent to a postage payment indicia label. Each label includes a partial fluorescent coating area and a printing area used to thermally print images including postage payment indicia and custom postage images.

In another configuration, a pigment selected from the quinazolinone class of pigments is mixed with a varnish to provide an invisible fluorescent ink that will provide an acceptable PMU level when coated in a relatively small surface area of the thermal media label, yet also maintain sufficient viscosity for application in a flexographic printing process.

In another configuration, two pigments including at least one from the quinazolinone class of pigments are mixed with an acrylic varnish base to provide a primarily green invisible fluorescent ink that will provide an acceptable PMU score when coated in a relatively small surface area of the thermal media label, yet also maintain sufficient viscosity for application in a flexographic printing process.

In yet another configuration, a thermal media label stock is processed with the application of two coats of an invisible fluorescent ink to a portion of the surface area of the thermal media labels. Several additional illustrative configurations are described below.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The illustrative embodiments of the present application describe physical thermal media configurations including a signaling ink coating along with several alternative fluorescent coating ink formulations including invisible green fluorescent ink formulations.

Figure 1:
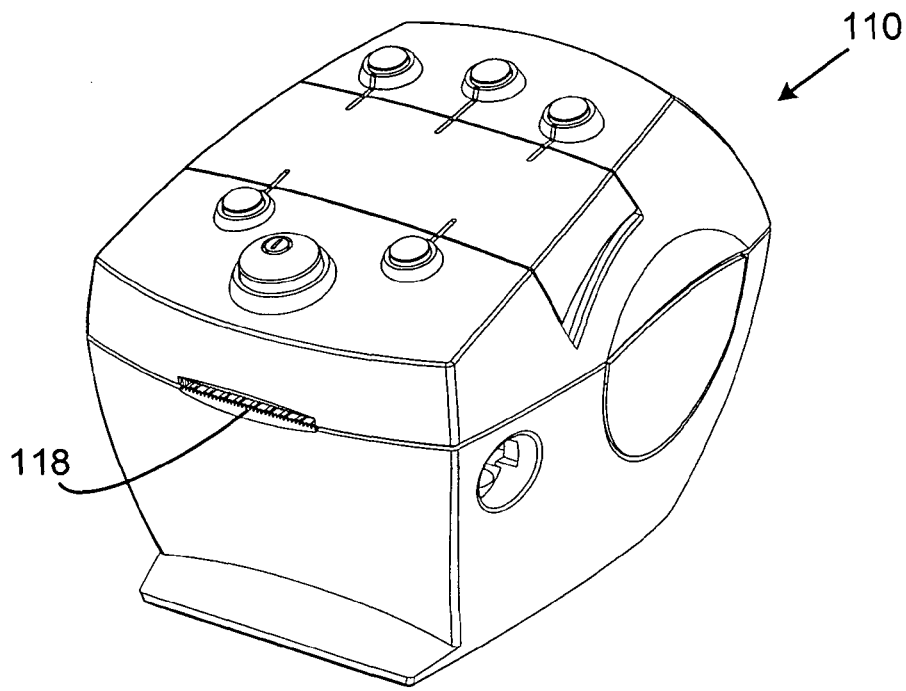
FIG. 1 is a generalized plan view of a thermal media printer used for printing custom postage labels as evidence of postage payment according to an embodiment of the present application.

Referring to FIG. 1, a generalized plan view of a thermal media printer 110 used for printing custom postage labels as evidence of postage payment according to an embodiment of the present application is shown. The labels are printed and then fed through port 118.

Figure 2:
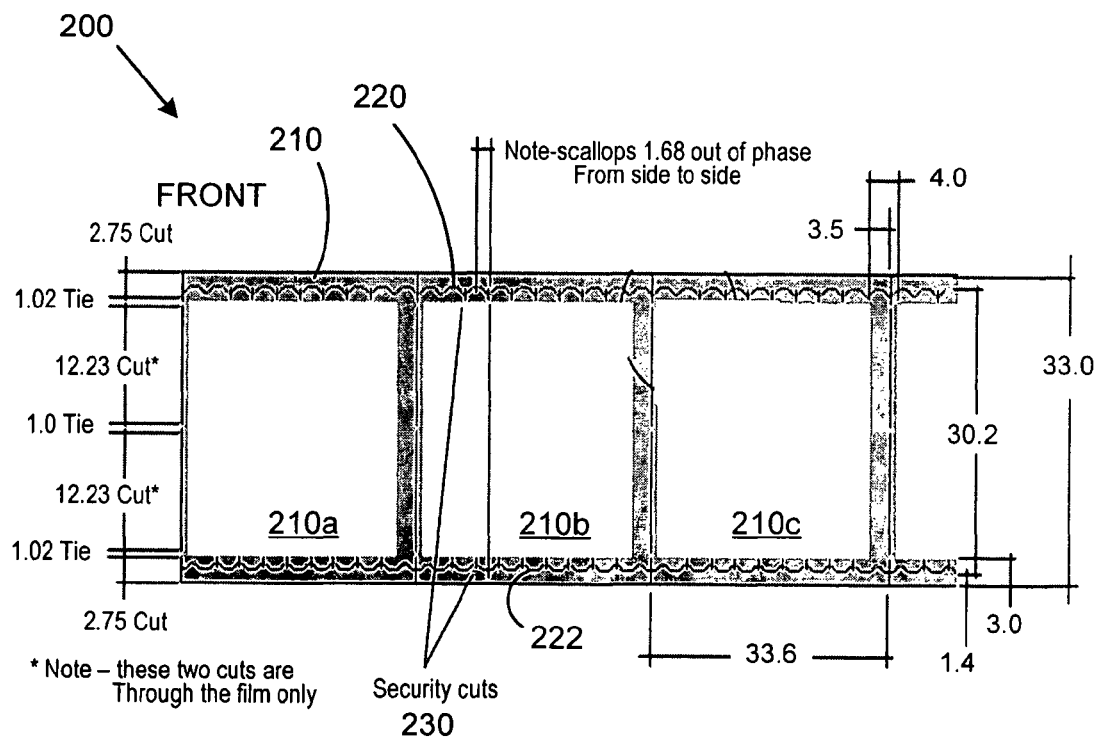
FIG. 2 is a top plan view of a section of a roll of thermal media labels including a fluorescent signaling section according to an illustrative embodiment of the present application for use with the thermal media printer of FIG. 1.

Referring to FIG. 2, a top plan view of a section of a roll of thermal media labels 200 including a fluorescent signaling section 210 according to an illustrative embodiment of the present application for use with the thermal media printer of FIG. 1 is shown. The label media 200 comprises a paper substrate or polypropylene thermal media substrate such as the Mitsubishi K61S-ce direct thermal media. The signaling portion 210 comprises a fluorescent ink coating on the media. The coating 210 comprises a taggant material, such as a luminescent material. The luminescent material comprises a fluorescent material such as an invisible primarily green or yellow fluorescent ink. The individual labels 210a, 210b and 210c are 33.6 mm wide and 33 mm high (including the adhesive backing material as the label media portion that is removed and used as a stamp is approximately 30.2 mm high as shown by the height from scallop to scallop).

As shown in FIG. 2, the 3.5 mm wide scallops 220, 222 are out of phase on opposing sides of the label. Such a configuration is utilized to keep the width approximately the same across the label. If there are variations in width across the label due to in-phase scalloping, such variation has been shown to create changes in pressure through the printing mechanism that results in a visible variations in print density (Pressure=Force/Area). Accordingly, the out-of-phase scalloping provides for more uniform print density and therefore higher quality printed images. Furthermore, 1.6 mm security cuts 230 are provided so that the labels will be somewhat frangible as a security measure and they will tear if a user attempts to remove a label from media after application. If the fluorescent signaling ink is coated on the borders of the thermal media label out side of the print zone, then the invisible fluorescent ink does not have to be as heat stable as if it would have to be if coated in the print zone. Even when using only a border signaling region, it is preferable that the varnish and resulting ink be sufficiently heat stable so that no jamming or damage occurs if the border is accidentally printed on.

In this embodiment, the signaling sections 210 are outside of the print zones of the label. As can be appreciated from the nature of adhesive labels, part of the fluorescent coating 210 is only applied to the top side of the adhesive backing that is not removed when the labels 210a, 210b, 210c are removed and applied.

Figure 3:
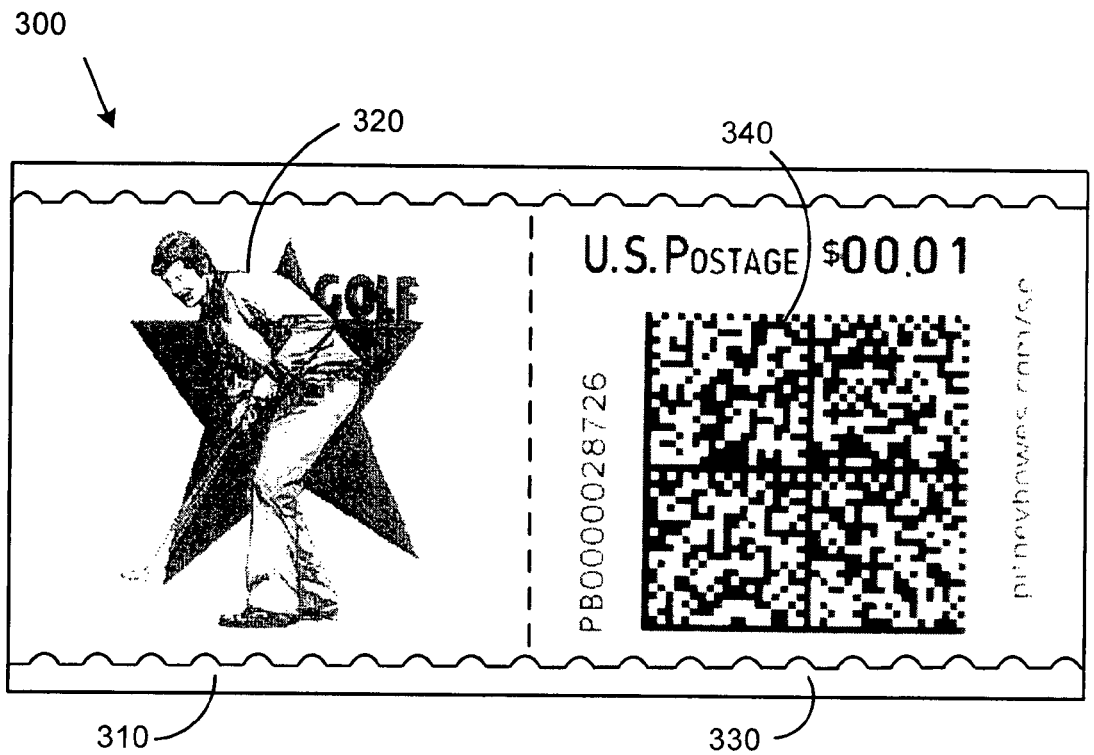
FIG. 3 is a top plan view of a custom postage label including a custom image label and a postage indicia label according to an illustrative embodiment of the present application.

Referring to FIG. 3, a top plan view of a custom postage label 300 including a custom image label 310 and a postage indicia label 330 according to an illustrative embodiment of the present application is shown. The roll of thermal media stock includes perforated labels having an adhesive and backing that may be utilized one at a time in a one-width configuration to include a postage payment indicia or in a two at a time two-wide configuration as shown in FIG. 3 including a custom image label adjacent to a postage payment indicia label. FIG. 3 shows a top plan view of the label pair 300 after an indicium 340 has been printed on the indicia label 330 and a custom image 320 has been printed on the custom image label 310. In this embodiment the blank label stock is used in a thermal postage printing device. However, features of the present invention could be used with other types of blank labels and with other types of printing devices. Furthermore, portions of the label or the entire label may have image and/or text preprinted on it.

Figure 4:
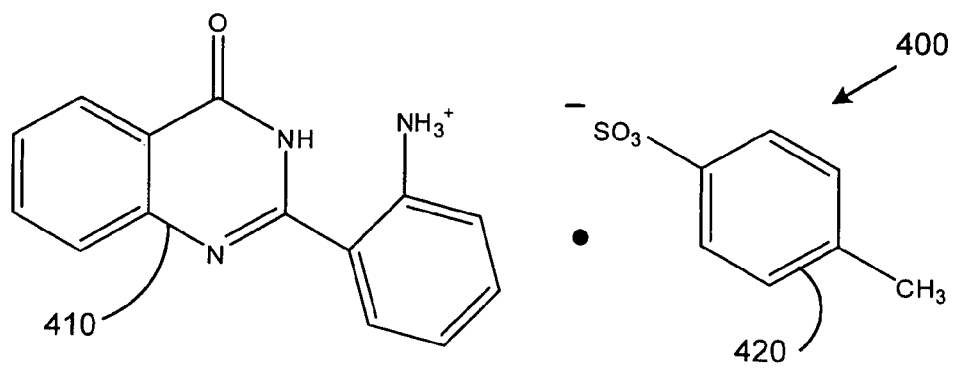
FIG. 4 is a diagram showing the chemical structure of a quinazolinone pigment according to an illustrative embodiment of the present application.

Referring to FIG. 4, a diagram showing a class of quinazolinone pigment 400 according to an illustrative embodiment of the present application is provided. This class of pigments may be utilized in the weight percent formulations described below in an acrylic varnish base to produce a suitable primarily green fluorescent signaling section that will fluoresce into the red range when excited by the ACFS. This pigment 440 includes a quinazolinone 410 bound to a tosylate salt 420.

Figure 5:
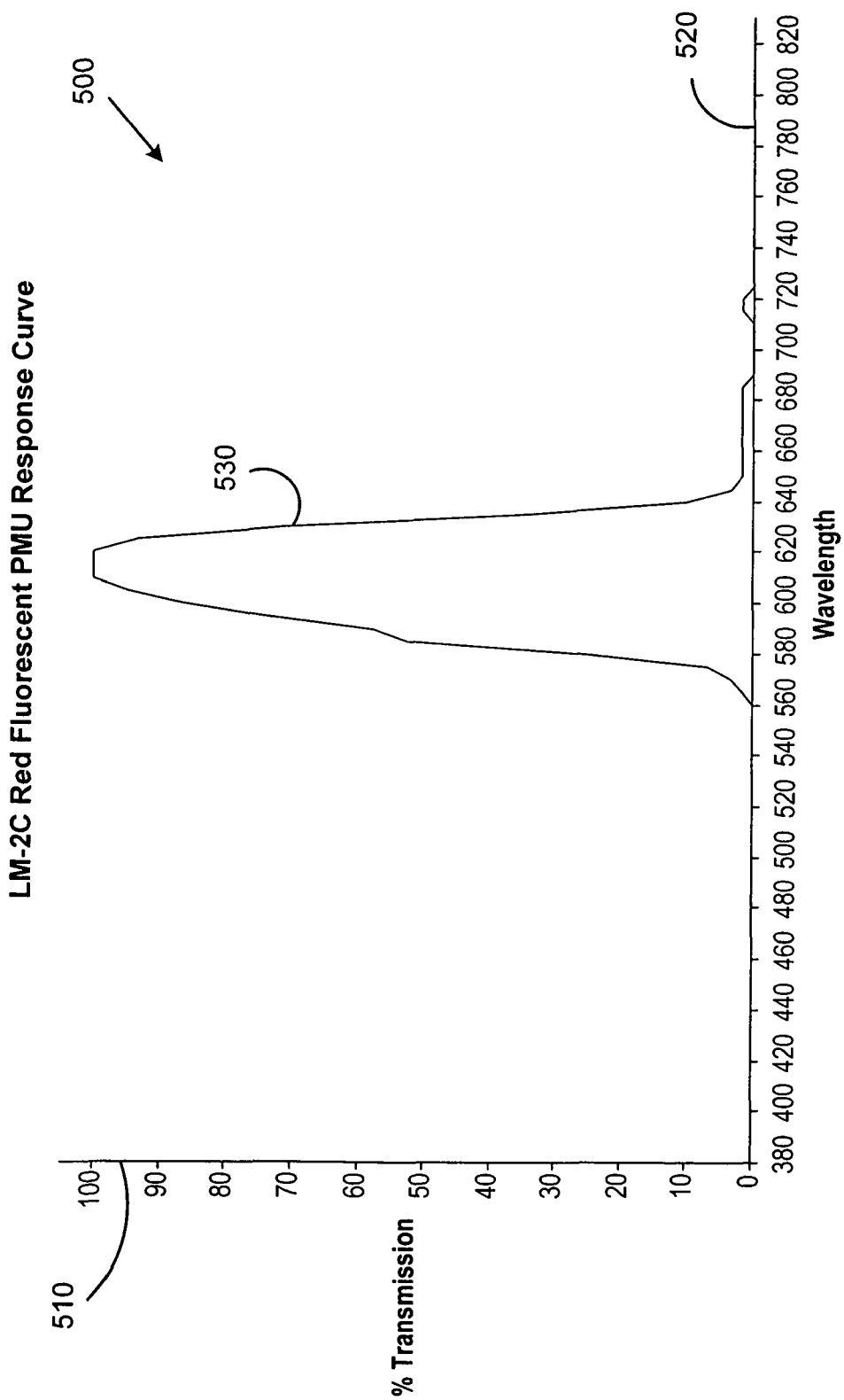
FIG. 5 is a chart showing a representative red fluorescent filter response curve.

Referring to FIG. 5, a chart 500 showing a representative red fluorescent test response curve 530 is shown. The response curve is shown as % transmission 510 against wavelength in nm 520. As shown in FIG. 5, the filters used in the detector detect emissions in approximately the 570 nm through 640 nm visible spectrum range that includes yellow, orange and red. Portions of the visible spectrum may be defined as green (500-570 nm), yellow (570-590 nm), orange (590-610 nm) and red (610-750 nm).

Figure 6:
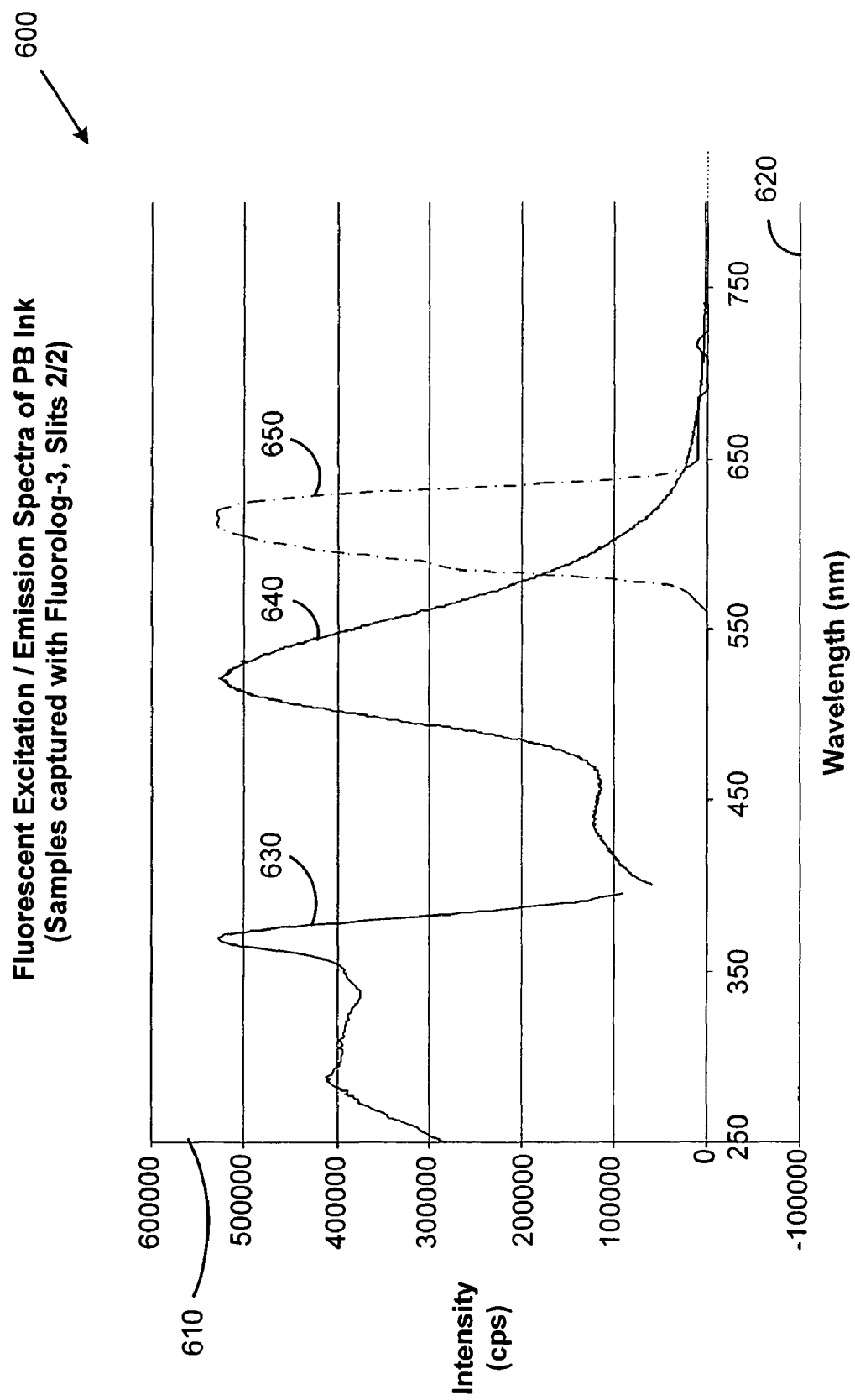
FIG. 6 is a chart showing a representative excitation curve, a fluorescent emission curve of an ink according to an embodiment of the present application and a representative red fluorescent filter response curve.

Referring to FIG. 6, is a chart 600 showing a representative excitation curve 630, a fluorescent emission curve 640 of an ink according to an embodiment of the present application and a representative red fluorescent filter response curve 650. The response curves are shown plotted as intensity in cps 610 versus wavelength in nm 620 and the measurements were made using a Fluorolog-3 fluorescent spectrophotometer.

The region of interest in FIG. 6 is the overlap area of the emission spectra 640 with the filter response curve 650 that is shown as overlap region 660. Even though the emission curve is primarily green, it has sufficient intensity in the red region to be detected by the filter response curve of the ACFS. As described herein, other alternative invisible fluorescent inks are described that have emission curves that are primarily yellow and others that may be primarily somewhere in the range of green to yellow that also provide sufficient intensity in the red range to be detected. As can be appreciated, the inks described herein do not exhibit any appreciable phosphorescent emission response that might confuse the AFCS.

The fluorescence was measured by using a fluorescence spectrophotometer known as the Fluorolog-3 from J. Y. Horiba of New Jersey. The spectrophotometer is calibrated by using a Xenon lamp scan and a water Raman scan. The Xenon lamp scan shows the spectral radiance of the excitation source through the excitation monochromator. The Xenon lamp has a distinct spectral output, with a maxima at 467 nm. The excitation monochromator is adjusted with the instrument supplied software to display the correct maxima. The emission monochromator is calibrated by measuring the Raman peak of water. Due to O-H stretching, a water sample when excited at 350 nm, will exhibit a peak at 397 nm. The emission monochomator is adjusted using the instrument supplied software so that the peak maxima is 397 nm. The instrument was set to an excitation of 254 nm and the slits set to 2 nm bandpass (0.470 mm slit width) for both the emissions and excitation monochromators. The fluorescent coated thermal media samples were then placed in the front face accessory and the sample compartment closed securely so that no stray light can enter the sample chamber. A 365 nm cut-on filter is placed in the emissions beam to prevent any 2nd order diffracted excitation light from obscuring the true spectra. An emissions spectra is then obtained in the visible region from 400-800 nm. The Fluorolog-3 records the results in photon counts per second (cps) for each wavelength.

Ink Mixing and Label Testing

The following process was utilized to fabricate test samples of fluorescent inks and signaling labels according to the illustrative examples described with the processing steps and the additional examples described herein. Additionally, the test procedure utilized to obtain the test results is described. As can be appreciated alternative manufacturing techniques and equipment may be utilized in a full scale production process as appropriate. In a first example, the L212 pigment that is commercially available from Beaver Luminescers, a Division of Beaver Cloth cutting Machines, Inc. of Newton Mass. was utilized along with the heat resistant Water Gloss HR Overprint Varnish Ink System WVH001025 Watergloss acrylic varnish that is commercially available from Water Ink Technologies, Inc. of Lincolnton, N.C. A portion of 12.5% (wt. percent) of L212 fluorescent pigment in powder form was added to 87.5% (wt. percent) of WVH1025 that is a liquid varnish and was stirred by hand to get the pigment fully wet by the solution. Unless otherwise noted, percentages are listed in weight percent.

A PRO 260 Homogenizer (a high shear mixer) was then used for 3 minutes at 10,000 RPM and for 1 minute at 25,000 RPM to create a uniform dispersion. A 5"×2.5" long strip of Mitsubishi K61S thermal media was placed on the KCC101 Control Coater (available from RK Print Coat Instruments Ltd. of the United Kingdom) with the thermal imaging layer facing up. A K-lox, 200 cells/linear inch anilox roller was installed in the KCC101 Control coater. The fluorescent dispersion was applied to the anilox roller (a laboratory flexographic process) and the coater was set at the maximum speed of 15 nm/s. This resulted in blank thermal media with an invisible fluorescent coating. The media may then be used in a direct contact thermal head printer without the invisible fluorescent coating coming off the media and fouling the print head. Furthermore, the coating does not result in blocking whereby a poorly formulated varnish when heated adheres to the hot thermal contact head and results in the media jamming. It is advantageous to use as little pigment as possible given the marking area to be used on the label that still provides consistently acceptable PMU results within a margin of error. Similarly, there are considerations of diminishing returns as the pigment levels are increased as well as viscosity issues such that it is desirable for the formulation to have a viscosity that is suitable for use in the flexographic printing processes described as well as mass production flexographic processes.

The sample thermal media thus constructed was then tested using a postal industry standard United States Postal Service (USPS) LM-2C Phosphor Meter Unit test system to measure the fluorescence intensity of the samples. The LM-2C includes a UV excitation source and a luminescence detector including appropriate filters and is utilized to measure fluorescence as a result of excitation with a pulsed short wavelength ultraviolet lamp (254 nm). The relative strength of the emission is displayed in Phosphor Meter Units (PMU). The PMU displayed is proportional to the energy collected by the detectors through a 5.2 cm2 aperture window, a PMU reading of 7 is considered acceptable for postal sorting operations. However, a safe minimum PMU threshold to provide for a very good safety margin would be 15 PMU. The LM-2C is designed with internal filters so that only specific emission wavelengths are allowed to reach the detectors (560 nm-660 nm). The test media is flood coated and the border coating such as shown in FIG. 3 is simulated using a mask. The resulting PMU value readings were evaluated by using a sheet of 1 mm thick black ABS plastic as a mask. Initially, a 4×26 mm slit (or 3 mm×26 mm as appropriate) was cut into the plastic mask. The mask size was related to the PMU meter aperture and the vertical portion of the border in FIG. 3 is approximately the same height. The horizontal border coating section are largely removed by the scalloping process, and were not simulated in testing, but would add somewhat to a margin of error providing better results that the simulated mask samples. This mask was then placed on the window of the USPS LM-2C PMU meter. The coated thermal paper test media for each example was then placed face down on the masking plastic and a PMU reading was obtained. Three PMU measurements were obtained for each media sample and the average recorded.

Certain existing postage payment evidencing systems utilize signaling sections including the CD380 Lumilux pigment as an invisible ink that can be used for facing. The CD380 Lumilux pigment based inks do not contain the green phosphorescence of stamps and do emit red fluorescence suitable for facing. Unfortunately, such compounds contain a high red phosphorescent signal that may interfere with AFCS canceller operation. In certain applications, the Blaze orange pigment from Dayglo has been utilized in full label flood coat signaling section applications, but given the small surface area available in border signaling section applications, the concentration of such pigment required to provide adequate red fluorescence response would be so high that the ink would be very visible.

As described herein, L212 pigment based inks may be utilized. Quazolinone class dyes and associated pigments are described. The L212 based inks described are completely invisible and provide a large green fluorescence signal. The green fluorescent peak signal response is large enough to extend in the red range such that it will trigger the facer mechanism of the AFCS. Furthermore, an embodiment of the ink utilizes a portion of the L212 pigment in combination with the SC-6 pigment from Angstrom Technologies and the resulting ink has been show to have a synergistic effect and in a 50%: 50% pigment ratio that a higher fluorescence than an ink having the total weight percent of pigment of either pigment alone.

Ink Formulations

EXAMPLE 1

In the first series of example ink formulations and test data presented below in Table 1, a target formulation of 12.5% wt. % L212 Fluorescent Pigment and 87.5% wt. % WV1025 varnish was selected to provide very good PMU results and acceptable viscosity while considering the economic issues of adding more expensive pigment in a range of diminishing PMU performance returns. According to the test results below, a range of L212 may be utilized from 6% to 17.5% L212 with the remaining portion of varnish. At the low end of the tested range, the PMU performance was acceptable, but provided less luminescence performance than the higher pigment concentration inks. At concentrations of 17.5% L212 pigment, the formulations would appear to exhibit diminishing PMU performance returns and increase the risk of encountering viscosity concerns in the application process. The ink formulations were tested using the two different signaling surface areas shown. In the samples described herein, the inks were flood coated and masked for testing at 4 mm×26 mm or 3 mm×26 mm as shown.

TABLE 1

| Ink | PMU - 3 mm × 26 mm | PMU - 4 mm × 26 mm |
|---|---|---|
| 6.0% L212 | 10 PMU | 15 PMU |
| 8.0% L212 | 12 PMU | 18 PMU |
| 12.5% L212 | 16 PMU | 23 PMU |
| 15.0% L212 | 17 PMU | 25 PMU |
| 17.5% L212 | 18 PMU | 26 PMU |

EXAMPLE 2

In the second series of example ink formulations and test data presented below in Table 2, an alternative pigment known as SC-6 and commercially available from Angstrom Technologies of Erlanger, Ky. was utilized. While SC-6 is primarily a yellow fluorescent pigment, it yielded sufficient red fluorescent response to the ACFS excitation source to trigger the facing systems. A target formulation of 12.5% wt. % SC-6 Fluorescent Pigment and 87.5% wt. % WV1025 varnish was selected to provide very good PMU results and acceptable viscosity while considering the economic issues of adding more expensive pigment in a range of diminishing PMU performance returns. According to the test results below, a range of SC-6 may be utilized from 9% to 20% SC-6 with the remaining portion of varnish. At the low end of the tested range, the PMU performance at 9% was acceptable, but provided less luminescence performance than the higher pigment concentration inks. At concentrations of 20% SC-6 pigment, the formulations would appear to exhibit diminishing PMU performance returns and increase the risk of encountering viscosity concerns in the application process. The ink formulations were tested using the two different signaling surface areas shown.

TABLE 2

| Ink | PMU - 3 mm × 26 mm | PMU - 4 mm × 26 mm |
|---|---|---|
| 9.0% SC-6 | 11 PMU | 15 PMU |
| 12.5% SC-6 | 15 PMU | 20 PMU |
| 15.0% SC-6 | 16 PMU | 21 PMU |
| 17.5% SC-6 | 17 PMU | 22 PMU |
| 20.0% SC-6 | 17 PMU | 23 PMU |

EXAMPLE 3

In the third series of example ink formulations and test data presented below in Table 3, an alternative combination of the L212 and SC-6 pigments was utilized. The combination of pigments including at least one quazolinone pigment produced apparently synergistic results shown below that performed better than an ink having the same amount of either pigment alone. A target formulation of 6.00% L212 Fluorescent Pigment, 6.00% SC-6 Fluorescent Pigment and 88.0% WV1025 varnish was selected to provide very good PMU results and acceptable viscosity while considering the economic issues of adding more expensive pigment in a range of diminishing PMU performance returns. According to the test results below, a range of 5% each of the pigments to 10% each of the two pigments with the remaining portion of varnish. At the low end of the tested range, the PMU performance at 10 wt. % of total pigments was acceptable, but provided less luminescence performance than the higher pigment concentration inks. At concentrations of 20% total pigment, the formulations would appear to exhibit diminishing PMU performance returns and increase the risk of encountering viscosity concerns in the application process. The ink formulations were tested using the two different signaling surface areas shown.

TABLE 3

| Ink | PMU 3 - mm × 26 mm | PMU - 4 mm × 26 mm |
|---|---|---|
| 3.0% SC-6 + 3.0% L212 | 6 PMU | 8 PMU |
| 5.0% SC-6 + 5.0% L212 | 12 PMU | 18 PMU |
| 6.0% SC-6 + 6.0% L212 | 19 PMU | 26 PMU |
| 10.0% SC-6 + 10% L212 | 21 PMU | 28 PMU |
| 12.0% L212 | 16 PMU | 23 PMU |

EXAMPLE 4

In the fourth series of example ink formulations and test data presented below in Table 4, an alternative combination of the target formulation of the formulation of Example 1 is provided with small amounts of the Blaze Orange pigment available from Dayglo Color Corp. of Cleveland, Ohio. A target formulation of 0.5% Blaze Orange (Dayglo) pigment, 12.5% L212 Fluorescent Pigment, and 87.0% WV1025 varnish. In a single coat application, the target formulations provided a fluorescent coating that performed well in terms of PMU response, but was slightly visible to the naked eye. The ink formulations were tested using the two different signaling surface areas shown.

TABLE 4

| Ink | PMU 3 × 26 mm | PMU - 4 mm × 26 mm |
|---|---|---|
| 12.5% L212 | 16 PMU | 23 PMU |
| 12.5% L212 + 0.75% Blaze Orange | 20 PMU | 28 PMU |
| 12.5% L212 + 0.5% Blaze Orange | 18 PMU | 26 PMU |

Dual Coat Formulations

In an alternative fluorescent ink coating process, a dual coat process is described. In order to simulate a two pass flexographic printing process, A 6" section of fully converted label roll was placed on the KCC101 coater. This material already contained a fluorescent coating border (using the 12.5% L212 and 87.5% WVH1025 formulation) on the label. Using a 33.2 mm×30 mm piece of removable tape the center of the label was masked. The top coat fluorescent solution was then applied to the anilox roller and the coater was set at the maximum speed of 15 m/s. The fluorescent mask was removed and this resulted in two layers of fluorescent coating with the correct thickness of 4 mm. the following Table 5 lists the 10 example top coat formulations tested along with the resulting PMU values using a 4 mm wide×26 mm signaling area. The remaining weight percent of the formulations of the top coat consists of WVH001025 varnish.

TABLE 5

| EX | Top Coat Fluorescent Ink Formulation | PMU - 4 mm × 26 mm |
|---|---|---|
| 1 | 12.5% L212 Double Coat | 27 PMU |
| 2 | 10% L212 + 2.5% Dayglo Blaze Orange SPL-15N** (Very visible tint) | 49 PMU |
| 3 | 12.5% L212 + 1.25% Dayglo Blaze Orange SPL-15N | 43 PMU |
| 4 | 12.5% L212 + 0.4% Dayglo Blaze Orange SPL-15N | 35 PMU |
| 5 | 12.5% L212 + 0.5% Dayglo Blaze Orange SPL-15N | 38 PMU |
| 6 | 12.5% L212 + 0.5% Dayglo Fire Orange SPL-14N | 32 PMU |
| 7 | 10% L212 + 5% Dayglo ECX-15 | 40 PMU |
| 8 | 10% L212 + 0.5% Dayglo Rocket Red SPL-13N | 37 PMU |
| 9 | 10% L212 + 0.5% Dayglo Aurora Pink SPL-11N | 37 PMU |
| 10 | 12.5% L212 + 0.5% Dayglo Saturn Yellow SPL-17N | 28 PMU |

Additional Alternatives

In an alternative applicable to each of the formulations described above, an American Water Graphics AWG 0482V film optical coating acrylic varnish may be substituted for the WVH001025 acrylic varnish base described. AWG 0482V is commercially available from American Water Graphics, Inc. of Forest City, N.C. Such alternative formulations flexographically process cleaner and thus require less maintenance if a flexographic printing process is used to apply the fluorescent ink. Additionally, the AWG 0482V does not appreciable quench the fluorescent pigments described above. Alternatively, other known coating processes may be utilized to coat the thermal media with the invisible fluorescent ink.

In an alternative applicable to each of the formulations described above, a fluorescent ink in an aqueous solution utilizing one of the pigments or comparable dye above may be applied to the media surface and then covered with an acrylic varnish layer such as by using the acrylic varnishes described above as a top coat. While the fluorescent material can have fluorescence at any detectable wavelength, it is preferred according to the invention that primary fluorescence be in the yellow though green range, e.g., from 500 to 590 nm that does not phosphoresce. Certain suitable pigments, dyes and classes of pigments and dyes are described in U.S. patent application Ser. No. 10/119,885.

Accordingly, the inks described herein will preferably contain a fluorescent particle dispersion capable of fluorescence primarily in the green through yellow ranges and secondarily in the red range when exposed to fluorescent activating radiation. Preferred particles of this type are produced by emulsion polymerization to immobilize, e.g., by embedding, a fluorescent dye or other colorant therein and thereby provide a physical separation of the fluorescent material from the dark colorants or their components.

In yet another alternative applicable to each of the formulations described above, the Mitsubishi PGT-80EX thermal media may be utilized along with an adhesive and backing film to create the postage labels described. Other pigments and dyes with similar properties to those described above may be utilized included SC-175 available from Angrstom Technologies and other compounds in those same classifications. Furthermore, the additional pigments listed in Table 5 could be used as the primary pigment in 12.5 wt percent with varnish to provide alternative formulations. Similarly, other pigments in the classifications of those specifically described may be utilized. Additionally, known alternative varnishes could be used.

The labels and inks described above are suitable for use with various direct thermal printers. For example, a thermal printer incorporating the Kyocera KSB320BA printhead available from Kyocera Industrial Ceramics Corp. of Vancouver, Wash. may be utilized. Furthermore, the STAMPEXPRESSIONS printer from Pitney Bowes Inc. of Stamford, Conn. may be utilized. The formulations herein may be applied in the print area of the label as well, but such application may increase the risk of paper jamming in certain thermal printers.

Commonly-owned, co-pending U.S. patent application Ser. No. 11/415,307, filed May 1, 2006 and entitled Apparatus and Materials for Two-Stage Printing of Value Indicia is incorporated by reference herein in its entirety and describes systems and methods for processing customized postage that alternatively may be advantageously utilized with the systems and methods described herein. Commonly-owned, co-pending U.S. patent application Ser. No. 11/172,182, filed Jun. 30, 2005 and entitled Control Panel Label For A Postage Printing Device is incorporated by reference herein in its entirety and describes systems and methods for processing customized postage that alternatively may be advantageously utilized with the systems and methods described herein. Additionally, commonly-owned, co-pending U.S. patent application Ser. No. 11/016,493, filed Dec. 17, 2004 and entitled, Thermal Printer Temperature Management, is incorporated by reference herein in its entirety and describes certain thermal printers that alternatively may advantageously be utilized with the systems and methods described herein.

Furthermore, commonly-owned, co-pending U.S. patent application Ser. No. 11/018,707, filed Dec. 21, 2004 and entitled, Label Stock For Thermal Printer, is incorporated by reference herein in its entirety and describes certain thermal printer label stock that alternatively may advantageously be utilized with the systems and methods described herein. Additionally, commonly-owned, co-pending U.S. patent application Ser. No. 11/016,493, filed Dec. 17, 2004 and entitled Thermal Printer Temperature Management, is incorporated by reference herein in its entirety and describes certain thermal printers that alternatively may advantageously be utilized with the systems and methods described herein. The label configurations and other embodiments described in application Ser. No. 10/873,887, entitled "Signaling Blank Label alternatively may advantageously be utilized with the systems and methods described herein.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. For example, while the embodiments described above utilize particular green luminescent inks (e.g., fluorescent ink), it should be appreciated that other types of energy emitting ink may be used that satisfy one or more of the needs discussed above. Accordingly, the invention is not to be considered as limited by the foregoing description but is only limited by the scope of the appended claims.

What is claimed is:

1. A postage label comprising:
a thermal media base; and
a fluorescent signaling section on the media base; wherein the fluorescent signal section comprises an invisible fluorescent ink that when excited by a short UV excitation source emits a primary fluorescent signal in green through yellow region of the visible spectrum, wherein the invisible fluorescent ink comprises an invisible fluorescent ink coating; and the signaling section comprises a signaling portion comprising only a border of the thermal media base and excluding a remaining non-border area of the thermal media base such that the border covers less than 20 percent of the surface area of the thermal media base and
wherein, the invisible fluorescent ink does not emit an appreciable phosphorescent signal when excited by the short UV excitation.

2. The postage label of claim 1 wherein:
the short UV excitation is at approximately 254 nm.

3. The postage label of claim 1 wherein:
the primary fluorescent signal emits in the range 450-600 nm when excited.

4. The postage label of claim 1 wherein:
the invisible fluorescent ink when excited by the short UV excitation source emits a fluorescent signal that includes sufficient intensity in a canceller PMU trigger region (570-640 nm) to trigger the canceller.

5. The postage label of claim 4 wherein:
the invisible fluorescent ink when excited by the short UV excitation source emits a fluorescent signal that produces a PMU over 7.

6. The postage label of claim 1 wherein:
the signaling section comprises a border of the thermal media base outside of a print area of the thermal media base.

7. The postage label of claim 1 wherein:
the invisible fluorescent ink comprises a dye that when excited by a short UV excitation source emits a primary fluorescent signal in the green through yellow region of the visible spectrum (500-590 nm).

8. The postage label of claim 1 wherein:
the invisible fluorescent ink comprises quazolinone dye.

9. The postage label of claim 1 wherein:
the invisible fluorescent ink comprises an L212 pigment.

10. The postage label of claim 1 wherein:
the invisible fluorescent ink comprises
a first pigment including a primary emission peak in the green region (500-570 nm) of the visible spectrum when excited by a short UV source (254 nm); and
a second pigment including a primary emission peak in the green region (570-590 nm) of the visible spectrum when excited by a short UV source (254 nm).

11. The postage label of claim 1 wherein:
the invisible fluorescent ink coating comprises a first coat of an invisible fluorescent ink that when excited by a short UV excitation source emits a primary peak fluorescent signal in green through yellow region (500-590 nm) of the visible spectrum and a second coat of an invisible fluorescent ink that when excited by a short UV excitation source emits a primary fluorescent signal in green through yellow region (500-590 nm) of the visible spectrum.

12. The postage label of claim 7 wherein:
the invisible fluorescent ink comprises a varnish.

13. The postage label of claim 12 wherein:
the varnish comprises an acrylic varnish.

14. The postage label of claim 1 wherein:
the invisible fluorescent ink comprises:
6-17 weight percent of a quazolinone class pigment that when excited by a short UV excitation source emits a primary fluorescent signal in the green through yellow region of the visible spectrum; and
83-94 weight percent of a varnish.

15. An aqueous invisible fluorescent ink capable of producing a fluorescent emission spectra when excited by a 254 nm UV source having a primary peak emission in the green through yellow region (500-590 nm) of the visible spectrum wherein the emission also emits sufficient intensity in the PMU trigger region (570-640 nm) to trigger the Advanced Facer Canceller System comprising:
a first fluorescent colorant comprising a fluorescent dye; and
an aqueous liquid vehicle, wherein the invisible fluorescent ink is invisible after it is applied to a media, and wherein,
the aqueous invisible fluorescent ink includes between 6 and 20 weight percent of total fluorescent colorant that includes the first fluorescent colorant comprising an organic dye in the quinazolinone class of dyes; and
the aqueous invisible fluorescent ink does not emit an appreciable phosphorescent signal when excited by the 254 nm UV source.

16. The ink according to claim 15 wherein the aqueous liquid vehicle comprises an acrylic polymer.

17. The ink according to claim 15 further comprising:
the aqueous invisible fluorescent ink includes between 5 and 10 weight percent of a second fluorescent colorant that comprises a second organic dye in the quinazolinone class of dyes that when excited by a 254 nm UV source has a primary peak emission in the yellow region (570-590 nm) of the visible spectrum; and wherein
the aqueous invisible fluorescent ink includes between 5 and 10 weight percent of the first fluorescent colorant that when excited by a 254 nm UV source has a primary peak emission in the green region (500-570 nm) of the visible spectrum.

18. The postage label of claim 1 wherein:
the invisible fluorescent ink is invisible after it is applied to a media.

19. The postage label of claim 1 wherein:
the invisible fluorescent ink comprises:
5-10 weight percent of a quazolinone class pigment that when excited by a short UV excitation source emits a primary fluorescent signal in the green region of the visible spectrum;
5-10 weight percent of a quazolinone class pigment that when excited by a short UV excitation source emits a primary fluorescent signal in the yellow region of the visible spectrum; and
80-90 weight percent of a liquid vehicle.

20. A postage label comprising:
a thermal media base; and
a fluorescent signaling section on the media base; wherein
the fluorescent signal section comprises an invisible fluorescent ink that when excited by a short UV excitation source emits a primary fluorescent signal in green through yellow region of the visible spectrum, wherein the invisible fluorescent ink comprises an invisible fluorescent ink coating; and the signaling section comprises a signaling portion comprising less than the total surface area of the thermal media base, and
the invisible fluorescent ink includes between 6 and 20 weight percent of a fluorescent colorant comprising an organic dye in the quinazolinone class of dyes that when excited by a short UV excitation source emits a primary fluorescent signal in the green through yellow region of the visible spectrum and 80-94 weight percent of a liquid vehicle; and
the invisible fluorescent ink does not emit an appreciable phosphorescent signal when excited by the short UV excitation source.

* * * * *